US012205154B2

(12) United States Patent
Kaveti et al.

(10) Patent No.: US 12,205,154 B2
(45) Date of Patent: Jan. 21, 2025

(54) REAL-TIME ERROR PREVENTION DURING INVOICE CREATION

(71) Applicant: INTUIT INC., Mountain View, CA (US)

(72) Inventors: Naveen Kumar Kaveti, Bangalore (IN); Vignesh Thirukazhukundram Subrahmaniam, Bangalore (IN); Abhishek Chauhan, Gurgaon (IN); Polavarapu Viswa Datha, Hyderabad (IN)

(73) Assignee: Intuit Inc., Mountain View, CA (US)

( * ) Notice: Subject to any disclaimer, the term of this patent is extended or adjusted under 35 U.S.C. 154(b) by 614 days.

(21) Appl. No.: 17/398,729

(22) Filed: Aug. 10, 2021

(65) Prior Publication Data

US 2023/0052619 A1 Feb. 16, 2023

(51) Int. Cl.
*G06Q 30/04* (2012.01)

(52) U.S. Cl.
CPC .................................... *G06Q 30/04* (2013.01)

(58) Field of Classification Search
CPC ...................................................... G06Q 30/04
See application file for complete search history.

(56) References Cited

U.S. PATENT DOCUMENTS 7,027,931 B1 * 4/2006 Jones ..................... G16B 50/30 422/50
8,374,906 B1 * 2/2013 Williams ............... G06Q 30/02 705/400
8,498,818 B1 * 7/2013 Jones, Jr. ............. G06Q 10/083 702/182
9,598,274 B1 * 3/2017 Criddle .................. B67D 7/348
10,789,653 B1 * 9/2020 Davis ..................... G06Q 40/12
2011/0125743 A1 * 5/2011 Immonen ................ G06F 16/29 707/E17.046
2012/0054642 A1 * 3/2012 Balsiger ................. G06Q 10/10 715/752
2012/0221448 A1 * 8/2012 Evans .................... G06Q 30/04 705/34

(Continued)

FOREIGN PATENT DOCUMENTS

WO WO-2021054952 A1 * 3/2021 ............. G06Q 10/10

*Primary Examiner* — Florian M Zeender
*Assistant Examiner* — Emily M. Kraisinger
(74) *Attorney, Agent, or Firm* — Patterson + Sheridan, LLP

(57) ABSTRACT

Aspects of the present disclosure relate to real-time invoice error prevention. Embodiments include receiving a value related to an item or service during creation of an invoice by a user via a user interface, and determining a user-level mean and a user-level standard deviation related to the value based on historical invoices of the user. Embodiments include determining a global mean and a global standard deviation related to the value based on historical invoices of a plurality of users. Embodiments include selecting weights for the user-level mean, the user-level standard deviation, the global mean, and the global standard deviation based on a total number of the historical invoices of the user. Embodiments include determining an expected range for the value based on the user-level mean, the user-level standard deviation, the global mean, the global standard deviation, and the weights. Embodiments include determining that the value is outside the expected range.

19 Claims, 5 Drawing Sheets

(56) References Cited

U.S. PATENT DOCUMENTS

| | | | | |
|---|---|---|---|---|
| 2013/0124525 | A1* | 5/2013 | Anderson | G06F 16/278 707/737 |
| 2013/0144782 | A1* | 6/2013 | Eberle | G06Q 20/102 705/40 |
| 2013/0212047 | A1* | 8/2013 | Lai | G06Q 10/107 706/12 |
| 2013/0262452 | A1* | 10/2013 | Kvernvik | G06F 16/245 707/722 |
| 2014/0279190 | A1* | 9/2014 | Severinghaus | G06Q 30/0631 705/26.7 |
| 2016/0086278 | A1* | 3/2016 | Renshaw | G06Q 40/04 705/36 R |
| 2019/0163786 | A1* | 5/2019 | Bansal | G06F 16/81 |
| 2022/0231981 | A1* | 7/2022 | Patel | H04L 51/226 |

* cited by examiner

REAL-TIME ERROR PREVENTION DURING INVOICE CREATION

INTRODUCTION

Aspects of the present disclosure relate to techniques for preventing errors related to creation of invoices via a user interface. In particular, techniques described herein involve predicting expected ranges for values associated with invoices and preventing errors based on the expected ranges during invoice creation.

BACKGROUND

Every year millions of people, businesses, and organizations around the world utilize software applications to assist with countless aspects of life. For example, many business rely on software applications for creating invoices and billing customers for products and services. Some software applications provide user interfaces that are configured to allow users to create invoices, such as by entering information such as a customer name, identifying information of an item or service, a quantity, a rate (e.g., cost per unit of an item or service), and the like via user interface controls.

In some cases, errors may be introduced during invoice creation, such as due to the volume of transactions managed by a business, the time it takes to manually enter and verify information in invoices, and the repetitive nature of invoice creation and review. Some research suggests that as many as 25% of invoices created using software applications are edited by businesses after being sent to customers. As such, there is a need in the art for improved techniques for computer-implemented invoice creation that include error prevention features.

BRIEF SUMMARY

Certain embodiments provide a method for real-time invoice error prevention. The method generally includes: receiving a value related to an item or service during creation of an invoice by a user via a user interface; determining a user-level mean and a user-level standard deviation related to the value based on historical invoices of the user; determining a global mean and a global standard deviation related to the value based on historical invoices of a plurality of users; selecting weights for the user-level mean, the user-level standard deviation, the global mean, and the global standard deviation based on a total number of the historical invoices of the user; determining an expected range for the value based on the user-level mean, the user-level standard deviation, the global mean, the global standard deviation, and the weights; determining that the value is outside the expected range; and displaying, within the user interface during creation of the invoice, a notification based on determining that the value is outside the expected range.

Other embodiments provide a method for real-time invoice error prevention. The method generally includes: receiving a quantity or rate related to an item or service during creation of an invoice by a user via a user interface; determining a user-level mean and a user-level standard deviation related to the quantity or rate based on historical invoices of the user related to the item or service; determining a global mean and a global standard deviation related to the quantity or rate based on historical invoices of a plurality of users related to the item or service; selecting weights for the user-level mean, the user-level standard deviation, the global mean, and the global standard deviation based on a total number of the historical invoices of the user related to the item or service; determining an expected range for the quantity or rate based on the user-level mean, the user-level standard deviation, the global mean, the global standard deviation, and the weights determining that the quantity or rate is outside the expected range; an modifying, during creation of the invoice, one or more aspects of the user interface related to the quantity or rate based on determining that the quantity or rate is outside the expected range.

Other embodiments provide a system comprising one or more processors and a non-transitory computer-readable medium comprising instructions that, when executed by the one or more processors, cause the system to perform a method. The method generally includes: receiving a value related to an item or service during creation of an invoice by a user via a user interface; determining a user-level mean and a user-level standard deviation related to the value based on historical invoices of the user; determining a global mean and a global standard deviation related to the value based on historical invoices of a plurality of users; selecting weights for the user-level mean, the user-level standard deviation, the global mean, and the global standard deviation based on a total number of the historical invoices of the user; determining an expected range for the value based on the user-level mean, the user-level standard deviation, the global mean, the global standard deviation, and the weights; determining that the value is outside the expected range; and displaying, within the user interface during creation of the invoice, a notification based on determining that the value is outside the expected range.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
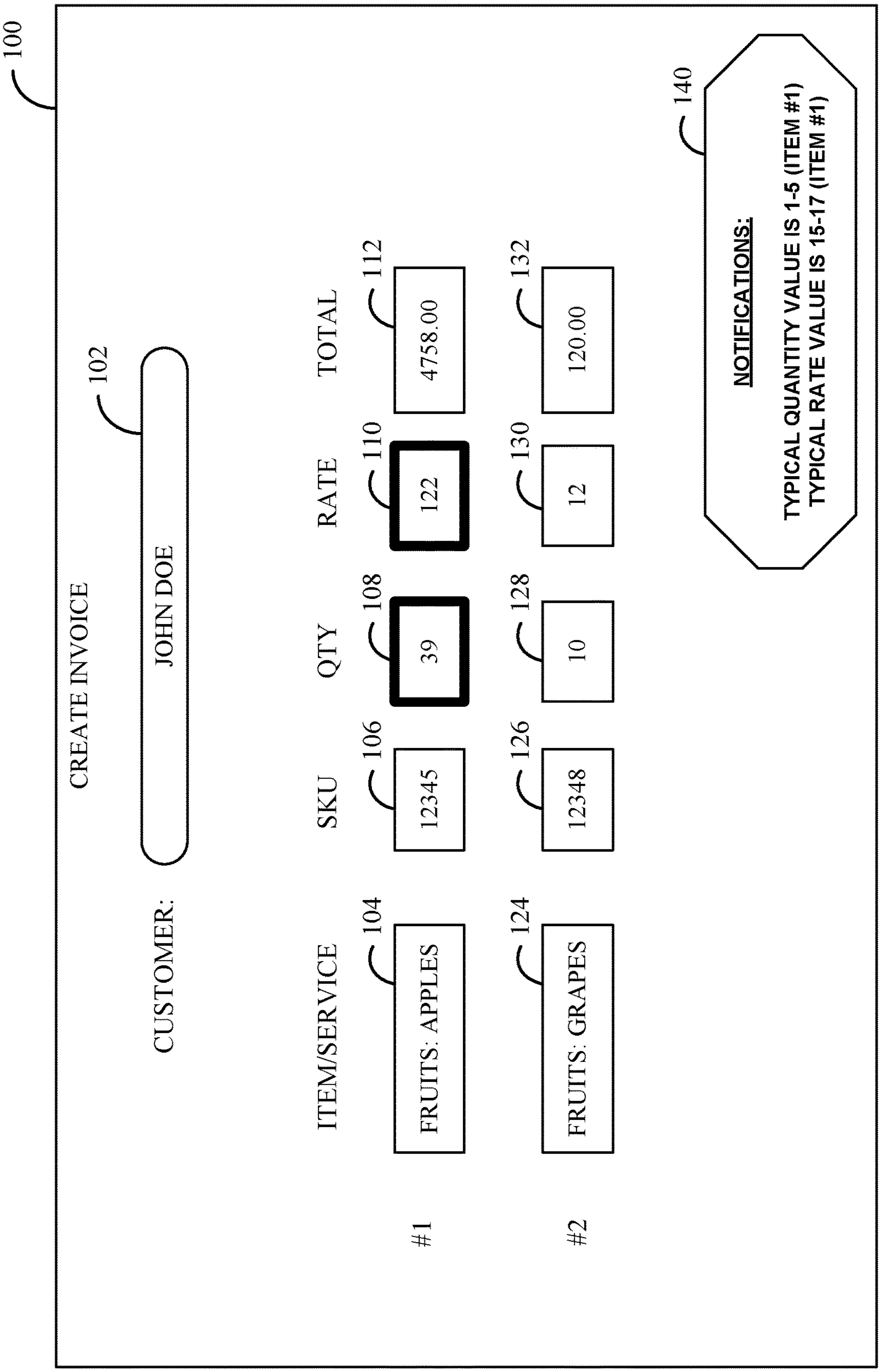
FIG. 1 depicts an example user interface screen related to real-time invoice error prevention.

Aspects of the present disclosure provide apparatuses, methods, processing systems, and computer-readable mediums for invoice error prevention.

A software application may allow for the creation of invoices, such as via a user interface with various controls that allow information related to the invoice to be entered by a user. In an example, a user enters identifying information of a customer, an item or service, a quantity, a rate, and/or the like via a user interface, and the application creates an invoice based on the entered information. In some cases, errors may be introduced during invoice creation. For instance, a user may enter an incorrect quantity or rate for a given item within an invoice, and the error may not be detected until after the invoice has been sent to a customer. As such, techniques described herein provide real-time error detection during invoice creation.

In an embodiment, an expected range is determined for a given value (e.g., quantity or rate) with respect to a given item or service for which an invoice is generated based on historical invoices. For example, historical invoices of the given user creating the current invoice and historical invoices of other users may be used to predict the expected range, such as using a weighted average of a mean and standard deviation for the value in the historical invoices of the given user and of the other users. For instance, after calculating a weighted average mean and a weighted average standard deviation, the range may include one or more weighted average standard deviations on either side of the weighted average mean.

In certain embodiments, the weighted average is based on how many relevant historical invoices of the given user are available. For instance, the historical invoices of the given user may be weighted more highly in the calculation than the historical invoices of other users if there is a large (e.g., higher than a threshold) number of relevant historical invoices for the given user available. Generally, a historical invoice is relevant if it relates to the item or service and/or the customer associated with the current invoice being prepared. By weighting historical invoices of the given user more highly if there is a sufficient number of such invoices available, techniques described herein allow for emphasis to be placed on values entered by the given user when possible, while still gaining insight from invoices created by other users. This weighted average concept may be referred to as an example of shrinkage estimation.

Shrinkage estimation addresses problems associated with drawing inferences from a "new" or small data set by incorporating additional data from outside the data set. For example, in shrinkage estimation, a naive or raw estimate (e.g., based on the small data set, such as the historical invoices of the given user) is improved by combining it with other information (e.g., a larger data set that may be less relevant but still informative, such as the historical invoices of other users). The term "shrinkage estimation" relates to the concept that the improved estimate may sometimes be based more on the "other information" than the raw estimate, such as based on the size of the data set from which the raw estimate is determined.

While certain embodiments involve using historical invoices for the same item or service and/or for the same customer as the current invoice when estimating an expected range for a value in the current invoice, other embodiments may rely on historical invoices for similar items or services and/or similar customers, such as based on embeddings.

For example, in some embodiments, "embeddings" of items, services, and/or customers are generated by determining n-dimensional vectors representing names of the items, services, and/or customers as vectors in n-dimensional space. For example, an embedding model used to generate embeddings may be a neural network, and may learn a representation (embedding) for a set of data through a training process that trains the neural network based on a data set, such as a plurality of strings (e.g., names of items, services, and/or customers).

In one example, the embedding model comprises a Bidirectional Encoder Representations from Transformer (BERT), which involves the use of masked language modeling to determine word embeddings. In other embodiments, the embedding model may involve existing embedding techniques, such as Word2Vec and GloVe embeddings. While some embodiments involve using names of items, services, and/or customers as input features to the embedding model to determine embeddings, other embodiments involve using other features, such as descriptive text and/or categories of items, services, and/or customers, as input features.

Embeddings may be used to identify items, services, and/or customers that are similar to one another, such as based on cosine similarities between embeddings and/or clustering techniques. Thus, historical invoices involving similar items or services and/or similar customers to those associated with the current invoice can be utilized, thereby allowing a larger historical data set to be relied on when determining expected ranges.

Determining an expected range for a value of an invoice being created by the given user, such as based on historical invoices of the given user and/or other users for the same and/or similar item, service, and/or customer, allows for real-time error prevention during invoice creation. For example, if the given user enters a value that is outside of the expected range, then a notification may be generated and/or one or more aspects of the user interface may be modified in order to alert the given user to the potential error.

Embodiments of the present disclosure provide multiple improvements over conventional techniques for invoice creation. For example, by utilizing shrinkage estimation techniques described herein to estimate an expected range for a value of an invoice being created by a user, embodiments of the present disclosure allow errors to be detected and prevented in real-time during invoice creation with a high level of accuracy, even when little historical invoice data is available for the user. Utilizing historical invoices of a larger population of users instead of only historical invoices of the particular user currently creating an invoice when estimating expected value ranges, while weighting the invoices differently based on the available quantity of historical invoices for the particular user, allows for intelligent utilization of a broader data set without placing undue emphasis on data that is potentially less relevant. Furthermore, by intervening within a user interface while the user is creating the invoice to alert the user to potential errors, techniques described herein allow invoice errors to be corrected efficiently and with minimal effort by the user, avoiding time-intensive manual reviews and the potential for sending flawed invoices to customers.

Additionally, the use of embeddings to identify items, services, and/or customers that are similar to those associated with the current invoice allows for a broader set of historical invoice data to be relied upon when estimating expected value ranges for the current invoice, thereby improving the estimates and allowing for more accurate error prevention. Accurate, real-time error prevention during invoice creation within a user interface avoids subsequent processing, storage, and communication resource utilization associated with auditing, correcting and/or re-sending invoices created using software applications.

Example User Interface Screen Related to Real-Time Invoice Error Prevention

FIG. 1 depicts an example user interface screen 100 related to real-time invoice error prevention. For example, screen 100 may be associated with a software application that allows users to manage various business tasks, such as creation of invoices. In some cases, screen 100 may be associated with a user interface running on a computing device, such as a desktop computer, laptop computer, mobile phone, tablet, or the like.

Screen 100 provides various user interface controls related to creating an invoice, such as to bill a customer for items or services. Control 102 allows a customer name to be entered. Controls 104 and 124 allow a name of an item or service to be entered. Controls 106 and 126 allow an item or service identifier, such as a stock-keeping unit (SKU), to be entered. Controls 108 and 128 allow a quantity to be entered. Controls 110 allow a rate (e.g., cost per unit) to be entered. Controls 112 and 132 allow a total to be entered, or may be automatically populated based the quantity and rate.

In some cases, various controls depicted in screen 100 may allow the user to select an item from a list. For example, each of controls 102, 104, 124, 106, and/or 126 may, when selected, cause a list of customers, items, services and/or SKUs to be displayed as options to be selected.

According to embodiments of the present disclosure, real-time error prevention is performed during invoice creation within screen 100. In an example, as described in more detail below with respect to FIG. 2, an expected range is determined for each of the values entered via controls 108, 128, 110, and 130 based on historical invoices of the user and historical invoices of other users.

Taking the quantity for item #1 (having the name "FRUITS: APPLES" and the SKU "12345") entered into control 108 as an example, an expected quantity range for apples is determined. Historical invoices for the user creating the invoice in screen 100 are retrieved, as well as historical invoices of other users.

First, a user-level mean and a user-level standard deviation for apple quantity (and/or quantities of items similar to apples, as described in more detail below with respect to FIG. 3) sold to the customer John Doe (and/or customers similar to John Doe, as described in more detail below with respect to FIG. 3) are determined based on the historical invoices of the user. Next, a global mean and global standard deviation for apple quantity (and/or quantities of items similar to apples) sold to the customer John Doe (and/or customers similar to John Doe) are determined based on the historical invoices of the plurality of users.

Weights are then determined for the user-level and global mean and standard deviation for apple quantity, as described in more detail below with respect to FIG. 2. In some embodiments, the weights are based on a number of relevant historical invoices of the user that are available such that the user-level mean and standard deviation are weighted more highly than the global mean and standard deviation if more than a threshold number of relevant historical invoices of the user are available. For a new user with no historical invoices or very few historical invoices, the user-level mean and standard deviation may be assigned weights at or near the lowest weight value (e.g., 0), while the global mean and standard deviation may be assigned weights at or near the highest weight value (e.g., 1).

A weighted average of the user-level mean and the global mean is then determined based on the weights, resulting in a final mean. Next, a weighted average of the user-level standard deviation and the global standard deviation is determined based on the weights, resulting in a final standard deviation. The final mean is used as a center point for an expected range, and the final standard deviation is used to determine the size of the expected range. For example, if the final mean is 3 and the final standard deviation is 2, then the expected range is 1-5 (e.g., allowing for 1 standard deviation (e.g., a deviation of 2 in this example) in either direction from a center point of 3).

A similar process to that described with respect to the quantity of item #1 may also be used to determine an expected range for the rate of item #1 as well as the quantity and rate of item #2 (e.g., names "Fruits: Grapes" and having a SKU of "12348").

The expected ranges are used to perform real-time error prevention during invoice creation. For example, values entered by the user via controls 108, 128, 110, and 120 may be compared to the expected ranges corresponding to the values in order to determine whether the values fall within the expected ranges. In screen 100, the value of 39 that is entered into control 108 for a quantity of item #1 falls outside of the expected range for that value (1-5). Similarly, the value of 122 that is entered into control 110 for a rate of item #1 falls outside of the expected range for that value (15-17). Thus, notifications 140 are displayed within screen 100 indicating the expected ranges for these values, thereby alerting the user to the potential errors. Additionally or alternatively, the appearance of controls 108 and 110 is changed within screen 100 based on the values being outside of the expected ranges. For example, controls 108 and 110 may be highlighted, their borders may be enlarged, one or more colors associated with controls 108 and 110 may be changed, one or more formatting changes may be made with respect to controls 108 and 110, one or more graphical elements may be added, removed, or otherwise changed with respect to controls 108 and 110, and/or the like.

In some embodiments, notifications 140 are displayed and the appearances of controls 108 and 110 are changed when it is determined that the values entered into controls 108 and 110 fall outside of their expected ranges, while in other embodiments, only the appearances of controls 108 and 110 are changed. In some cases, when the user selects or moves a cursor over control 108 or control 110, a notification is displayed indicating the expected range for the value associated with the control. For instance, if the user moves a cursor over control 108, a notification may be displayed (e.g., proximate to control 108) indicating that the expected range is 1-5.

The values entered into controls 128 and 130 for the quantity and rate of item #2 (grapes) fall within the expected ranges for those values, and so no notifications are displayed and no changes are made to the appearances of controls 128 and 130.

In some embodiments, even though the values entered into controls 128 and 130 fall within the expected ranges for those values, selecting or moving a cursor over control 128 or 130 may still cause a notification to be displayed indicating the expected range associated with the control. In some cases, the user may select or move a cursor over a control prior to entering a value via the control in order to see the expected range associated with the control as a point of reference. As such, expected ranges for values associated with controls may be determined before any values are entered by the user in the controls. For example, as soon as the user has identified an item or service (and, in some embodiments, a customer) during invoice creation, techniques described herein may be utilized to determine expected ranges for a quantity and rate associated with the item or service.

Notifications 140, changes to controls 108 and 110, and/or additional notifications or changes within screen 100 based on techniques described herein allow for errors to be prevented in real-time during invoice creation. For instance, the user may determine based on the notifications and/or user interface changes that one or more of the values entered via controls 108 and 110 are incorrect, and may correct the one or more values accordingly.

Real-Time Invoice Error Prevention Techniques

Figure 2:
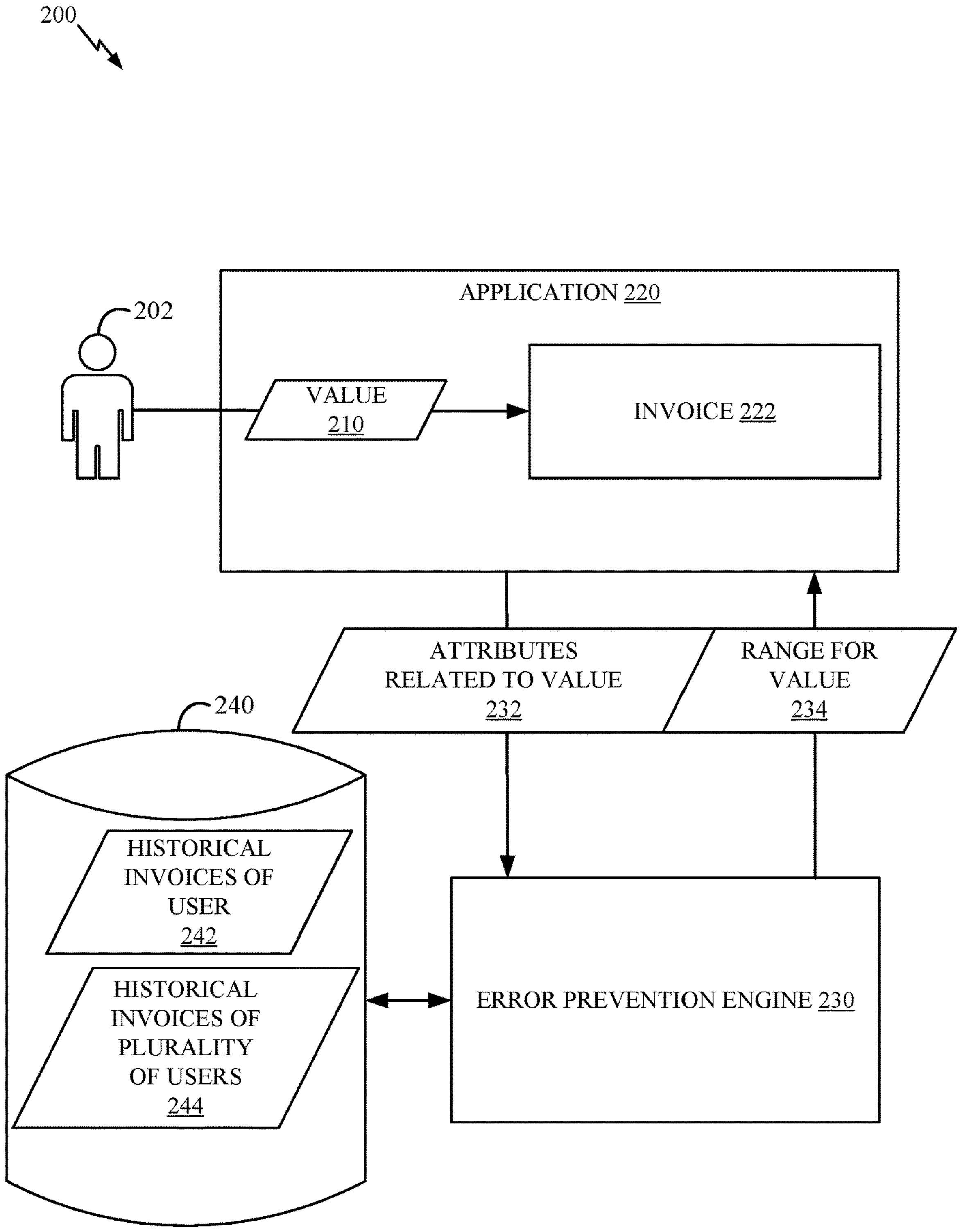
FIG. 2 is an illustration of an example related to real-time invoice error prevention.

FIG. 2 is an illustration 200 of an example related to real-time invoice error prevention.

Illustration 200 includes an application 220, which generally represents a software application that provides functionality related to creation of invoices. It is noted that while certain embodiments are described with respect to invoices, techniques described herein for real-time error prevention may be used in other types of software applications for preventing errors in other types of values.

In some embodiments, application 220 is associated with a user interface, such as user interface screen 100 of FIG. 1, which allows a user 202 to create an invoice 222. Invoice 222 generally represents an invoice created based on input from user 202, and may include values related to items or services for which a customer is billed. User 202 provides a value 210 via the user interface, such as by entering a quantity or rate for an item or service included in invoice 222.

Application 210 provides one or more attributes 232 related to value 210 to an error prevention engine 230. Attributes 232 may include, for example, identifying information of an item or service to which value 210 relates and/or identifying information of a customer associated with invoice 222. In a particular example, application 220 provides a name and/or SKU of the item or service and a name of the customer to error prevention engine 230.

Error prevention engine 230 generally comprises one or more components that perform operations related to real-time invoice error prevention. In some embodiments, error prevention engine 230 is part of application 210. In other embodiments error prevention engine 230 is separate from application 220, and is located either on the same device as application 220 or a separate device from application 220. In certain embodiments, a client-server architecture is utilized. For example, user 202 may interact with application 220 via a user interface provided on a client device (e.g., computer or mobile phone), and certain processing related to application 220, such as real-time error prevention operations performed by error prevention engine 230, may be performed on one or more remote devices (e.g., a server computer) connected to the client device via a network. In other embodiments, all processing related to application 220 and error prevention engine 230 is performed on a single device.

Error prevention engine 230 determines a range 234 for value 210 based on attributes 232 in view of historical invoices, such as using weighted average techniques. Error prevention 230 accesses historical invoices 242 of user 202 as well as historical invoices 244 of a plurality of users (e.g., all users of application 220 or a subset of users of application 220 having one or more characteristics), which are stored in a data store 240. Data store 240 generally represents a data storage entity such as a database or repository that stores data related to application 220 and/or error prevention engine 230. In some cases, historical invoices 244 include the historical invoices 242 of user 202, while in other cases historical invoices 244 include only historical invoices of users other than user 202. In some embodiments, historical invoices are grouped into subsets or tagged with metadata that allows associations to be identified based on characteristics related to the invoices, such as business type, business size, geographic location, status of user account (e.g., active, inactive, hidden, not hidden, and/or the like), age of user account, invoice date, and/or the like. Thus, in certain embodiments, historical invoices 244 may include historical invoices that share one or more characteristics with invoice 222 and/or that meet one or more other conditions, such as corresponding to a certain date range. Similarly, historical invoices 242 may include only historical invoices of user 202 that meet certain conditions, such as corresponding to a certain date range.

Error prevention engine 230 uses historical invoices 242 and 244 to determine range 234 based on attributes 232. In one example, error prevention engine 230 uses shrinkage estimation techniques to determine a weighted average of a user-level mean and a global mean as well as a weighted average of a user-level standard deviation and a global standard deviation corresponding value 210 in historical invoices 242 and 244. Weights may be determined based on a number of relevant historical invoices 242 of user 202. Historical invoices may be relevant if they relate to attributes 232, such as if they correspond to the same (or, in some embodiments, similar) item or service and/or customer as value 210. Items, services, and/or customers may be determined to be similar to one another based on embeddings, as described in more detail below with respect to FIG. 3.

In some cases, range 234 is determined using double shrinkage empirical Bayesian estimation, in which both a mean and a standard deviation for a value are determined based on a weighted average of user-level data and global data.

Once range 234 is determined by error prevention engine 230 (e.g., based on the final estimated mean and standard deviation for the value), error prevention engine 230 provides the range 234 to application 220, which may perform real-time error prevention operations based on a comparison of value 210 with range 234. For instance, if value 210 falls outside of range 234, a notification may be displayed within the user interface associated with application 220 indicating the expected range and/or one or more user interface controls may be modified (e.g., resulting in a change in appearance to alert user 202 to a potential error).

Example Clustering Related to Real-Time Invoice Error Prevention

Figure 3:
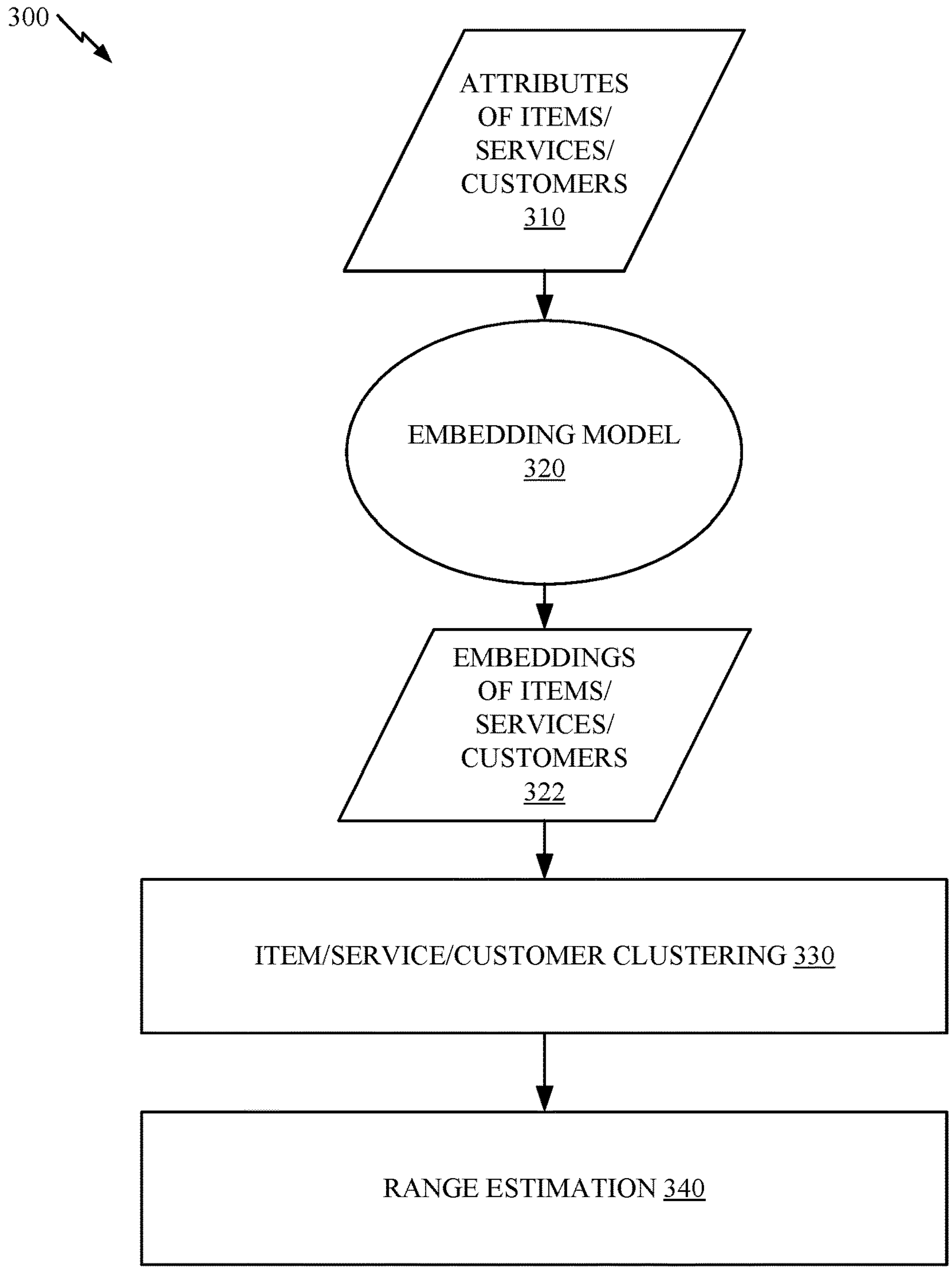
FIG. 3 is an illustration of clustering related to real-time invoice error prevention.

FIG. 3 is an illustration 300 of an example of clustering related to real-time invoice error prevention. For example, illustration 300 may relate to determining which items, services, and/or customers are similar to one another for the purpose of determining which historical invoices to use for error prevention techniques described herein.

Illustration 300 includes an embedding model 320, which may be a machine learning model that produces embeddings of items, services, and/or customers. In one example, embedding model 320 is a BERT transformer.

Attributes 310 of items, services, and/or customers are provided as inputs to embedding model 320. Attributes 310 may comprise names of items, services, and/or customers (e.g., text strings). In some embodiments, attributes 310 include SKUs of items or services, categories of items or services, descriptions of items or services, and/or other attributes of items or services. In certain embodiments, attributes 310 include characteristics of customers, such as geographic location, invoice history, and/or other customer characteristics.

Embedding model 320 outputs embeddings 322 for the items, services, and/or customers corresponding to attributes 310. Embeddings 322 may be vector representations comprising points in n-dimensional space.

Embeddings 322 are used during a clustering stage 330 identify items, services, and/or customers that are similar to one another. For example, clustering algorithms may be utilized in order to group embeddings that are close to one another in n-dimensional space. In some embodiments, clustering 330 involves determining cosine similarities between embeddings and determining whether any two given embeddings are similar to one another based on whether the cosine similarity between the two given embeddings reaches a threshold.

Range estimation 340 involves utilizing techniques described herein for estimating expected ranges for values associated with invoices based on historical invoices. The results of clustering 330 may be used during range estimation 340 to determine which historical invoices are relevant for a given value. For example, when determining an expected range for a value related to a particular item in an invoice, historical invoices related to the particular item and similar items (e.g., items having an embeddings determined to be sufficiently similar to the embedding of the particular item) may be used in a weighted average calculation, as described above with respect to FIGS. 1 and 2. Similarly, historical invoices related to a particular service or similar services may be utilized. Likewise, historical invoices related to a particular customer or similar customers may be utilized. Thus, techniques described herein allow for estimating an expected range for a value based not only on historical invoices directly including the item, service, and/or customer to which the value relates, but also based on historical invoices relating to similar items, services, and/or customers.

Example Operations for Real-Time Invoice Error Prevention

Figure 4:
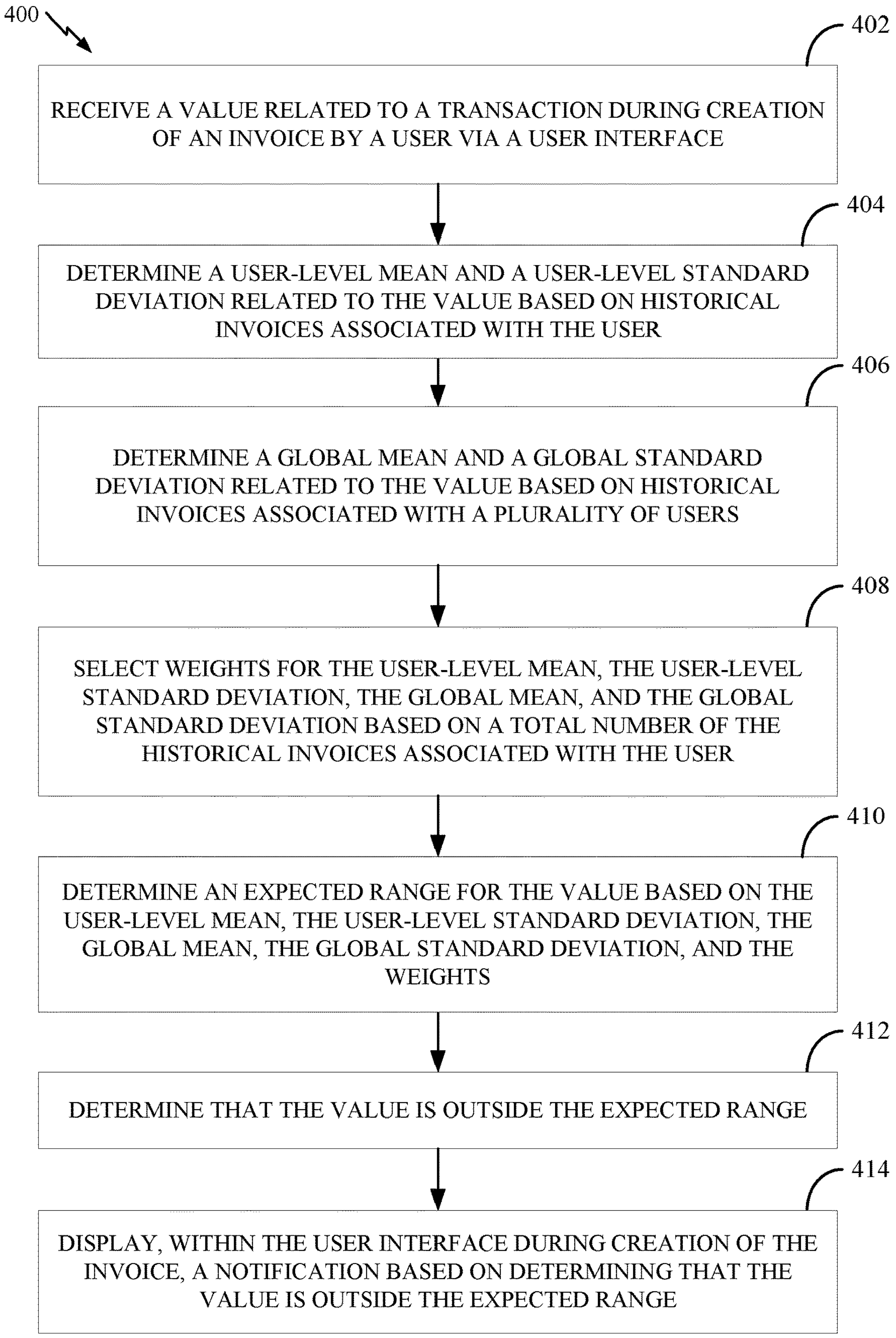
FIG. 4 depicts example operations related to real-time invoice error prevention.

FIG. 4 depicts example operations 400 for real-time invoice error prevention. For example, operations 400 may be performed by error prevention engine 230 and/or application 220 of FIG. 2.

Operations 400 begin at step 402 with receiving a value related to an item or service during creation of an invoice by a user via a user interface. The invoice may be related to an item or service and a given customer. The value may, for example, comprise quantity or rate.

Operations 400 continue at step 404 with determining a user-level mean and a user-level standard deviation related to the value based on historical invoices of the user. The historical invoices of the user may be associated with the given customer and/or may be related to the item or service.

Operations 400 continue at step 406 with determining a global mean and a global standard deviation related to the value based on historical invoices of a plurality of users. The historical invoices of the plurality of users may be associated with the given customer and/or may be related to the item or service.

Some embodiments include selecting the historical invoices of the user and the historical invoices of the plurality of users based on an embedding of the item or service and embeddings of items or services associated with the historical invoices of the user and the historical invoices of the plurality of users. For example, selecting the historical invoices of the user and the historical invoices of the plurality of users may comprise determining that similarity measures between the embedding of the item or service and each of the embeddings of the items or services associated with the historical invoices of the user and the historical invoices of the plurality of users exceed a threshold.

Operations 400 continue at step 408 with selecting weights for the user-level mean, the user-level standard deviation, the global mean, and the global standard deviation based on a total number of the historical invoices of the user. In some embodiments, selecting the weights for the user-level mean, the user-level standard deviation, the global mean, and the global standard deviation based on the total number of the historical invoices of the user comprises assigning higher weights to the user-level mean and the user-level standard deviation than to the global mean and the global standard deviation if the total number of the historical invoices of the user is above a threshold. In one example, the user-level mean and standard deviation are assigned equal weights to those assigned to the global mean and standard deviation by default, and the weights are adjusted based on the total number of the historical invoices of the user. For instance, the weights may be equal unless the total number of the historical invoices of the user exceeds a threshold. In another embodiment, the user-level mean and standard deviation are assigned higher weights to those assigned to the global mean and standard deviation by default, and the weights are adjusted based on the total number of the historical invoices of the user. For instance, the weights assigned to the user-level mean and standard deviation may be higher than the weights assigned to the global mean and standard deviation unless the total number of the historical invoices of the user falls below a threshold. In one example, the weights assigned to the global mean and standard deviation are only higher than the weights assigned to the user-level mean and standard deviation if the total number of the historical invoices of the user is below a threshold.

Operations 400 continue at step 410 with determining an expected range for the value based on the user-level mean, the user-level standard deviation, the global mean, the global standard deviation, and the weights. In some embodiments, determining the expected range for the value based on the user-level mean, the user-level standard deviation, the global mean, the global standard deviation, and the weights comprises calculating, based on the weights, a weighted average of the user-level mean and the global mean and a weighted average of the user-level standard deviation and the global standard deviation, such as utilizing shrinkage estimation.

Operations 400 continue at step 412 with determining that the value is outside the expected range.

Operations 400 continue at step 414 with displaying, within the user interface during creation of the invoice, a notification based on determining that the value is outside the expected range. Some embodiments include modifying, during creation of the invoice, one or more aspects of the user interface related to the value (e.g., quantity or rate) based on determining that the value is outside the expected range.

Notably, operations 400 is just one example with a selection of example steps, but additional methods with more, fewer, and/or different steps are possible based on the disclosure herein.

Example Computing System

Figure 5:
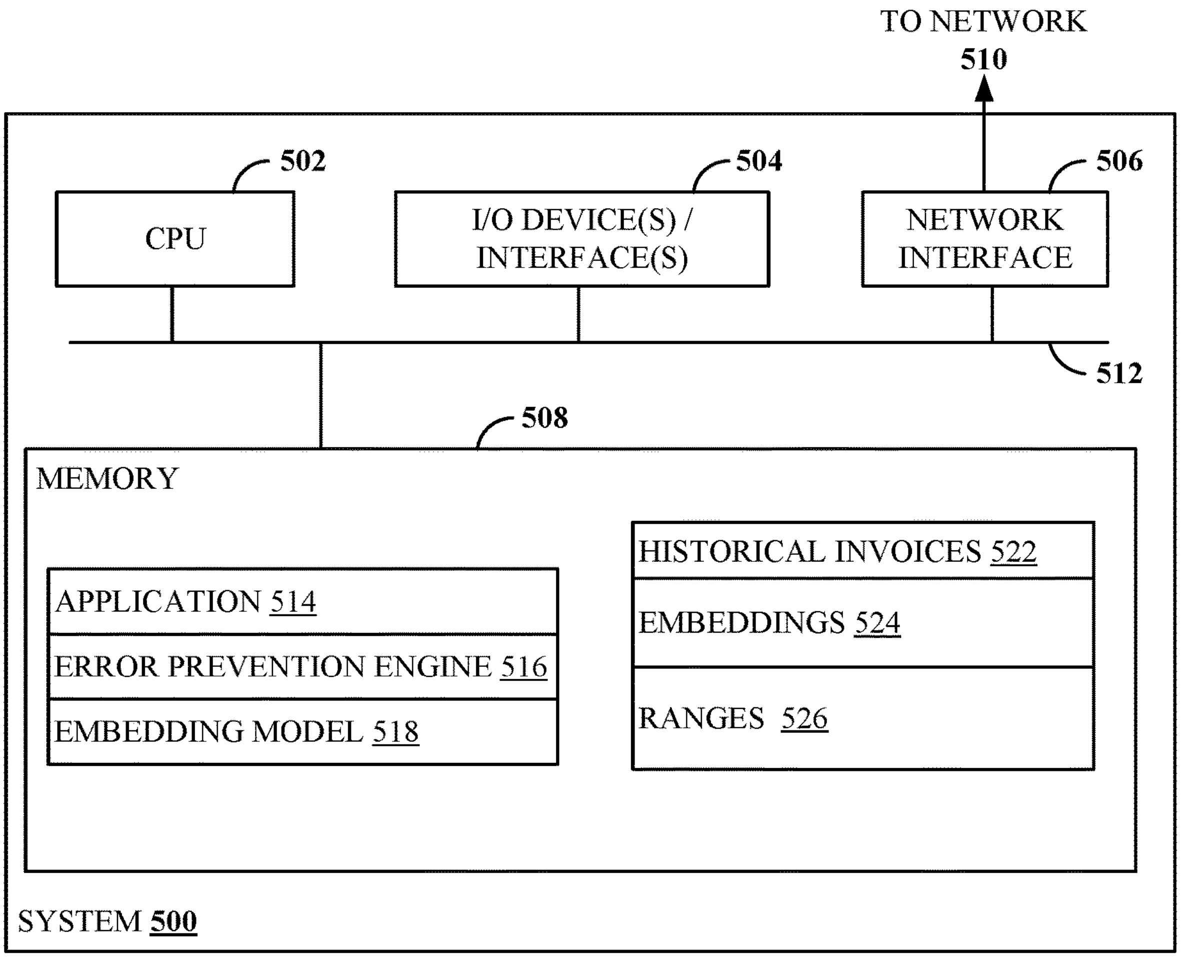
FIG. 5 depicts an example processing system for real-time invoice error prevention.

FIG. 5 illustrates an example system 500 with which embodiments of the present disclosure may be implemented. For example, system 500 may be configured to perform operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, error prevention engine 516, and embedding model 528, which may be representative of application 220 and error prevention engine 230 of FIG. 2 and embedding model 320 of FIG. 3.

Memory 508 further comprises historical invoices 522, which may include historical invoices 242 and 244 of FIG. 2. Memory 508 further comprises embeddings 524, which may include embeddings 322 of FIG. 3. Memory 508 further comprises user ranges 526, which may include range 234 of FIG. 2.

Example Clauses

Clause 1: A method for real-time invoice error prevention, comprising: receiving a value related to an item or service during creation of an invoice by a user via a user interface; determining a user-level mean and a user-level standard deviation related to the value based on historical invoices of the user; determining a global mean and a global standard deviation related to the value based on historical invoices of a plurality of users; selecting weights for the user-level mean, the user-level standard deviation, the global mean, and the global standard deviation based on a total number of the historical invoices of the user; determining an expected range for the value based on the user-level mean, the user-level standard deviation, the global mean, the global standard deviation, and the weights; determining that the value is outside the expected range; and displaying, within the user interface during creation of the invoice, a notification based on determining that the value is outside the expected range.

Clause 2: The method of Clause 1, wherein determining the expected range for the value based on the user-level mean, the user-level standard deviation, the global mean, the global standard deviation, and the weights comprises calculating, based on the weights, a weighted average of the user-level mean and the global mean and a weighted average of the user-level standard deviation and the global standard deviation.

Clause 3: The method of Clause 2, wherein calculating, based on the weights, the weighted average of the user-level mean and the global mean and the weighted average of the user-level standard deviation and the global standard deviation comprises utilizing shrinkage estimation.

Clause 4: The method of any one of Clause 1-3, wherein: the invoice is associated with a given customer; the historical invoices of the user are associated with the given customer; and the historical invoices of the plurality of users are associated with the given customer.

Clause 5: The method of any one of Clause 1-4, wherein: the historical invoices of the user are associated with the item or service; and the historical invoices of the plurality of users are associated with the item or service.

Clause 6: The method of any one of Clause 1-5, wherein selecting the weights for the user-level mean, the user-level standard deviation, the global mean, and the global standard deviation based on the total number of the historical invoices of the user comprises assigning higher weights to the user-level mean and the user-level standard deviation than to the global mean and the global standard deviation if the total number of the historical invoices of the user is above a threshold.

Clause 7: The method of any one of Clause 1-6, further comprising selecting the historical invoices of the user and the historical invoices of the plurality of users based on: an embedding of the item or service; and embeddings of items or services associated with the historical invoices of the user and the historical invoices of the plurality of users.

Clause 8: The method of Clause 7, wherein selecting the historical invoices of the user and the historical invoices of the plurality of users comprises determining that similarity measures between the embedding of the item or service and each of the embeddings of the items or services associated with the historical invoices of the user and the historical invoices of the plurality of users exceed a threshold.

Clause 9: A method for real-time invoice error prevention, comprising: receiving a quantity or rate related to an item or service during creation of an invoice by a user via a user interface; determining a user-level mean and a user-level standard deviation related to the quantity or rate based on historical invoices of the user related to the item or service; determining a global mean and a global standard deviation related to the quantity or rate based on historical invoices of a plurality of users related to the item or service; selecting weights for the user-level mean, the user-level standard deviation, the global mean, and the global standard deviation based on a total number of the historical invoices of the user related to the item or service; determining an expected range for the quantity or rate based on the user-level mean, the user-level standard deviation, the global mean, the global standard deviation, and the weights; determining that the quantity or rate is outside the expected range; and modifying, during creation of the invoice, one or more aspects of the user interface related to the quantity or rate based on determining that the quantity or rate is outside the expected range.

Clause 10: The method of Clause 9, wherein determining the expected range for the value based on the user-level mean, the user-level standard deviation, the global mean, the global standard deviation, and the weights comprises calculating, based on the weights, a weighted average of the user-level mean and the global mean and a weighted average of the user-level standard deviation and the global standard deviation.

Clause 11: The method of Clause 10, wherein calculating, based on the weights, the weighted average of the user-level mean and the global mean and the weighted average of the user-level standard deviation and the global standard deviation comprises utilizing shrinkage estimation.

Clause 12: The method of any one of Clause 9-11, wherein: the invoice is associated with a given customer; the historical invoices of the user are associated with the given customer; and the historical invoices of the plurality of users are associated with the given customer.

Clause 13: A system for real-time invoice error prevention, comprising: one or more processors; and a memory comprising instructions that, when executed by the one or more processors, cause the system to: receive a value related to an item or service during creation of an invoice by a user via a user interface; determine a user-level mean and a user-level standard deviation related to the value based on historical invoices of the user; determine a global mean and a global standard deviation related to the value based on historical invoices of a plurality of users; select weights for the user-level mean, the user-level standard deviation, the global mean, and the global standard deviation based on a total number of the historical invoices of the user; determine an expected range for the value based on the user-level mean, the user-level standard deviation, the global mean, the global standard deviation, and the weights; determine that the value is outside the expected range; and display, within the user interface during creation of the invoice, a notification based on determining that the value is outside the expected range.

Clause 14: The system of Clause 13, wherein determining the expected range for the value based on the user-level mean, the user-level standard deviation, the global mean, the global standard deviation, and the weights comprises calculating, based on the weights, a weighted average of the user-level mean and the global mean and a weighted average of the user-level standard deviation and the global standard deviation.

Clause 15: The system of Clause 14, wherein calculating, based on the weights, the weighted average of the user-level mean and the global mean and the weighted average of the user-level standard deviation and the global standard deviation comprises utilizing shrinkage estimation.

Clause 16: The system of any one of Clause 13-15, wherein: the invoice is associated with a given customer; the historical invoices of the user are associated with the given customer; and the historical invoices of the plurality of users are associated with the given customer.

Clause 17: The system of any one of Clause 13-16, wherein: the historical invoices of the user are associated with the item or service; and the historical invoices of the plurality of users are associated with the item or service.

Clause 18: The system of Clause 17, wherein selecting the weights for the user-level mean, the user-level standard deviation, the global mean, and the global standard deviation based on the total number of the historical invoices of the user comprises assigning higher weights to the user-level mean and the user-level standard deviation than to the global mean and the global standard deviation if the total number of the historical invoices of the user is above a threshold.

Clause 19: The system of any one of Clause 13-18, wherein the instructions, when executed by the one or more processors, further cause the system to select the historical invoices of the user and the historical invoices of the plurality of users based on: an embedding of the item or service; and embeddings of items or services associated with the historical invoices of the user and the historical invoices of the plurality of users.

Clause 20: The system of Clause 19, wherein selecting the historical invoices of the user and the historical invoices of the plurality of users comprises determining that similarity measures between the embedding of the item or service and each of the embeddings of the items or services associated with the historical invoices of the user and the historical invoices of the plurality of users exceed a threshold.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, “determining” may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean “one and only one” unless specifically so stated, but rather “one or more.” Unless specifically stated otherwise, the term “some” refers to one or more. No claim element is to be construed under the provisions of 35 U.S.C. § 112(f) unless the element is expressly recited using the phrase “means for” or, in the case of a method claim, the element is recited using the phrase “step for.” All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for real-time invoice error prevention, comprising:

receiving a value that a user enters into a number field of a user interface during creation of an invoice, the value related to an item or service;

determining a user-level mean and a user-level standard deviation related to the value based on historical invoices of the user;

determining a global mean and a global standard deviation related to the value based on historical invoices of a plurality of users;

selecting weights for the user-level mean, the user-level standard deviation, the global mean, and the global standard deviation based on a total number of the historical invoices of the user;

determining an expected range for the value based on the user-level mean, the user-level standard deviation, the global mean, the global standard deviation, and the weights;

determining that the value is outside the expected range;

responsive to determining the value is outside the expected range:

displaying, within the user interface during creation of the invoice, a notification that includes the expected range for the value; and modifying, during creation of the invoice, an appearance of the number field to prompt the user to alter the value to be within the expected range for the value in response to the displaying and the modifying, receiving user input at the number field, the user input associated with adjusting the value to be within the expected range; and in response to receiving the user input: stop displaying the notification and undo the modifying of the appearance of the number field.

2. The method of claim 1, wherein determining the expected range for the value based on the user-level mean, the user-level standard deviation, the global mean, the global standard deviation, and the weights comprises calculating, based on the weights, a weighted average of the user-level mean and the global mean and a weighted average of the user-level standard deviation and the global standard deviation.

3. The method of claim 2, wherein calculating, based on the weights, the weighted average of the user-level mean and the global mean and the weighted average of the user-level standard deviation and the global standard deviation comprises utilizing shrinkage estimation.

4. The method of claim 1, wherein:

the invoice is associated with a given customer;

the historical invoices of the user are associated with the given customer; and the historical invoices of the plurality of users are associated with the given customer.

5. The method of claim 1, wherein:

the historical invoices of the user are associated with the item or service; and the historical invoices of the plurality of users are associated with the item or service.

6. The method of claim 1, wherein selecting the weights for the user-level mean, the user-level standard deviation, the global mean, and the global standard deviation based on the total number of the historical invoices of the user comprises assigning higher weights to the user-level mean and the user-level standard deviation than to the global mean and the global standard deviation if the total number of the historical invoices of the user is above a threshold.

7. The method of claim 1, further comprising selecting the historical invoices of the user and the historical invoices of the plurality of users based on:

an embedding of the item or service; and embeddings of items or services associated with the historical invoices of the user and the historical invoices of the plurality of users.

8. The method of claim 7, wherein selecting the historical invoices of the user and the historical invoices of the plurality of users comprises determining that similarity measures between the embedding of the item or service and each of the embeddings of the items or services associated with the historical invoices of the user and the historical invoices of the plurality of users exceed a threshold.

9. A method for real-time invoice error prevention, comprising:

receiving a quantity or rate that a user enters into a number field of a user interface during creation of an invoice, the quantity or rate related to an item or service;

determining a user-level mean and a user-level standard deviation related to the quantity or rate based on historical invoices of the user related to the item or service;

determining a global mean and a global standard deviation related to the quantity or rate based on historical invoices of a plurality of users related to the item or service;

selecting weights for the user-level mean, the user-level standard deviation, the global mean, and the global standard deviation based on a total number of the historical invoices of the user related to the item or service;

determining an expected range for the quantity or rate based on the user-level mean, the user-level standard deviation, the global mean, the global standard deviation, and the weights;

determining that the quantity or rate is outside the expected range; and responsive to determining the quantity or rate is outside the expected range:

displaying, within the user interface during creation of the invoice, a notification that includes the expected range for the quantity or rate; and modifying, during creation of the invoice, an appearance of the number field to prompt the user to alter the quantity or range to be within the expected range for the quantity or rate in response to the displaying and the modifying, receiving user input at the number field, the user input associated with adjusting the quantity or rate to be within the expected range; and in response to receiving the user input: stop displaying the notification and undo the modifying of the appearance of the number field.

10. The method of claim 9, wherein determining the expected range for the quantity or rate based on the user-level mean, the user-level standard deviation, the global mean, the global standard deviation, and the weights comprises calculating, based on the weights, a weighted average of the user-level mean and the global mean and a weighted average of the user-level standard deviation and the global standard deviation.

11. The method of claim 10, wherein calculating, based on the weights, the weighted average of the user-level mean and the global mean and the weighted average of the user-level standard deviation and the global standard deviation comprises utilizing shrinkage estimation.

12. The method of claim 9, wherein:

the invoice is associated with a given customer;

the historical invoices of the user are associated with the given customer; and the historical invoices of the plurality of users are associated with the given customer.

13. A system for real-time invoice error prevention, comprising:

one or more processors; and a memory comprising instructions that, when executed by the one or more processors, cause the system to:

receive a value that a user enters into a number field of a user interface during creation of an invoice, the value related to an item or service;

determine a user-level mean and a user-level standard deviation related to the value based on historical invoices of the user;

determine a global mean and a global standard deviation related to the value based on historical invoices of a plurality of users;

select weights for the user-level mean, the user-level standard deviation, the global mean, and the global standard deviation based on a total number of the historical invoices of the user;

determine an expected range for the value based on the user-level mean, the user-level standard deviation, the global mean, the global standard deviation, and the weights;

determine that the value is outside the expected range; and responsive to determining the value is outside the expected range:

display, within the user interface during creation of the invoice, a notification that includes the expected range for the value; and modify, during creation of the invoice, an appearance of the number field to prompt the user to alter the value to be within the expected range in response to displaying and modifying, receive user input at the number field, the user input associated with adjusting the value to be within the expected range; and in response to receiving the user input: stop displaying the notification and undo the modifying of the appearance of the number field.

14. The system of claim 13, wherein selecting the weights for the user-level mean, the user-level standard deviation, the global mean, and the global standard deviation based on the total number of the historical invoices of the user comprises assigning higher weights to the user-level mean and the user-level standard deviation than to the global mean and the global standard deviation if the total number of the historical invoices of the user is above a threshold.

15. The system of claim 13, wherein the instructions, when executed by the one or more processors, further cause the system to select the historical invoices of the user and the historical invoices of the plurality of users based on:

an embedding of the item or service; and embeddings of items or services associated with the historical invoices of the user and the historical invoices of the plurality of users.

16. The method of claim 1, wherein modifying the appearance of the number field comprises highlighting the number field.

17. The method of claim 1, wherein modifying the appearance of the number field comprises enlarging a border of the number field.

18. The method of claim 1, wherein modifying the appearance of the number field comprises changing one or more colors associated with the number field.

19. The method of claim 1, wherein:

modifying the appearance of the number field comprises highlighting the number field; and to undo the modifying of the appearance of the number field comprises dehighlighting the number field.

* * * * *